(12) United States Patent
Kordon et al.

(10) Patent No.: US 8,345,870 B2
(45) Date of Patent: Jan. 1, 2013

(54) METHOD AND APPARATUS FOR ENCRYPTING ENCODED AUDIO SIGNAL

(75) Inventors: Sven Kordon, Hannover (DE); Johannes Boehm, Goettingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 1087 days.

(21) Appl. No.: 12/227,192

(22) PCT Filed: May 3, 2007

(86) PCT No.: PCT/EP2007/054287
§ 371 (c)(1),
(2), (4) Date: Nov. 10, 2008

(87) PCT Pub. No.: WO2007/131885
PCT Pub. Date: Nov. 22, 2007

(65) Prior Publication Data
US 2009/0122992 A1 May 14, 2009

(30) Foreign Application Priority Data
May 12, 2006 (EP) .................................. 06113898

(51) Int. Cl.
*H04N 7/167* (2011.01)
*H04L 29/06* (2006.01)
(52) U.S. Cl. ........ 380/236; 380/203; 380/217; 380/237; 380/239; 713/160; 713/165; 713/171; 726/3; 726/26; 726/30
(58) Field of Classification Search ............... 380/236, 380/237, 239; 713/153; 726/13
See application file for complete search history.

(56) References Cited

U.S. PATENT DOCUMENTS

| | | | |
|---|---|---|---|
| 7,513,436 B2* | 4/2009 | Schuessler et al. | 235/492 |
| 2004/0028227 A1* | 2/2004 | Yu | 380/201 |
| 2004/0196972 A1* | 10/2004 | Zhu et al. | 380/45 |
| 2004/0196975 A1* | 10/2004 | Zhu et al. | 380/258 |
| 2004/0208120 A1* | 10/2004 | Shenoi | 370/229 |
| 2005/0276416 A1* | 12/2005 | Zhu et al. | 380/210 |
| 2006/0282665 A1* | 12/2006 | Zhu et al. | 713/160 |
| 2007/0291836 A1* | 12/2007 | Shi et al. | 375/240.01 |
| 2009/0034721 A1* | 2/2009 | Yan et al. | 380/42 |

OTHER PUBLICATIONS

Patrick Aichroth et: "Personalized Previews: An Alternative Concept of Virtual Goods Marketing", Virtual Goods 2004—Int'l Workshop for Technology, May 27, 2004, XP002408865.
B.B. Zhu et al: "An efficient key scheme for layered access control of MPEG-4 FGS video" Multimedia and Expo, 2004. ICME 04.2004 IEEE Int'l Conf. on Taipei, Taiwan Jun. 27-30, 2004, vol. 1, pp. 443-446; XP010770843.
Ye Wang et al: "A framework for robust and scalable audio streaming" ACM Multimedia Proc. ACM Int. Conf. Multimedia: ACM Multimedia 2004, Proceedings of the 12th ACM Int'l Conf. 2004, pp. 144-151, XP002408866.
Search Report Dated Oct. 16, 2007.

\* cited by examiner

*Primary Examiner* — Yin-Chen Shaw
*Assistant Examiner* — Jenise Jackson
(74) *Attorney, Agent, or Firm* — Tutunjian & Bitetto, P.C.

(57) ABSTRACT

Advanced solutions for encrypting multi-layer audio data are required, ie. audio data that comprise a base layer and one or more enhancement layers. A method for encrypting such an encoded audio signal comprises separating the base layer into two sections, encrypting the side information within frames of the second section of the base layer, and encrypting at least a part of the data of the enhancement layer, wherein the encrypted section of the base layer and the encrypted enhancement layer require different decryption keys for decryption. Thus, free preview zones are possible to implement.

12 Claims, 3 Drawing Sheets

METHOD AND APPARATUS FOR ENCRYPTING ENCODED AUDIO SIGNAL

This application claims the benefit, under 35 U.S.C. §365 of International Application PCT/EP2007/054287, filed May 3, 2007, which was published in accordance with PCT Article 21(2) on Nov. 22, 2007 in English and which claims the benefit of European patent application No. 06113898.8, filed May 12, 2006.

FIELD OF THE INVENTION

This invention relates to a method and an apparatus for encrypting an encoded audio signal.

BACKGROUND

One challenge of today's media industry is the protection of copyrights. Therefore Digital Rights Management (DRM) is well established, see e.g. "Digital Rights Management" in http://www.microsoft.com/windows/windowsmedia/drm/default.mspx. DRM gives access rights to digital media content for certified users. These access rights can restrict the number of allowed copies and deny access of uncertified users. The protection is organized with user, content and device dependent encryption techniques.

One problem of DRM is the restriction for users when modifying and copying content they own for their purposes. Different devices need different signal qualities or representations for playing and storing contents. New security paradigms employing a DRM solution for personal private networks of different devices are shown e.g. in Popescu, Crispo, Tanenbaum: "Support for Multi-Level Security Policies in DRM Architectures", accessible under http://www.cs.vu.nl/~bpopescu/papers/nspw04/nspw04.html.

One way to make DRM more attractive or acceptable for users is shown in the "Freebies" project of Fraunhofer IDTM, http://www.idmt.fraunhofer.de/eng/research_topics/freebies.htm, where uncertified users have access to one part of the content for advertising purposes. This free part can be shorter than the original, of lower signal quality or include promotion jingles.

However, advanced solutions for encrypting multi-layer audio data are required, ie. audio data that comprise a base layer (BL) and one or more enhancement layers (EL).

SUMMARY OF THE INVENTION

The present invention provides methods and apparatus for encrypting multi-layer audio data. Particularly it is shown how such audio data can be partially (e.g. section-wise) encrypted. A description of right protection for scaleable media content, as well as implementation examples for an mp-3 lossless coder is given.

According to one aspect of the present invention, a method for encrypting an encoded audio signal, the encoded audio signal comprising BL and at least one EL, wherein the BL has audio data packed in frames, wherein a frame comprises header, main audio data, additional information used for decoding and error check data relating at least to the additional information, comprises the steps of separating the BL temporally into a first section and at least one second section, encrypting the additional information within frames of the second section of the BL, wherein the first section of the BL and the main audio data of the second section of the BL are not encrypted, and encrypting at least a part of the data of the EL, wherein the encrypted section of the BL and the encrypted EL require different decryption keys for decryption.

An advantage of the invention is that for a conventional player that encounters the encrypted content of the base layer, but can not decrypt it, the encryption will appear like a checksum error. Thus, the player may automatically mute, instead of generating noise.

In one embodiment, the method for encrypting encoded audio data further comprises the step of inserting into the BL one or more frames that contain auxiliary data, wherein these auxiliary data may include one or more of DRM indications, preview duration indications or content owner contact information (e.g. brand name, Internet address).

In one embodiment, the EL has a header and at least two sub-layers and is structured in frames, wherein a frame contains at least one data packet for each of the sub-layers, and wherein the packets for at least one sub-layer are encrypted.

In one embodiment, the EL contains header information comprising information that specifies one or more temporal regions of the EL that are encrypted, wherein a part of said information is encrypted. Said information in the EL header may e.g. specify how audio data in the respective region are permutated, and/or may comprise a fingerprint value that is derived from the encrypted EL before encryption. Said information in the EL header may also comprise a list that contains pointers pointing at groups of adjacent EL blocks or frames, and information that specifies encryption and/or decryption information for the respective group, e.g. an indication of frame permutation within the respective group.

According to one aspect of the invention, an encrypted and encoded audio signal comprises BL and EL, wherein the BL has audio data packetized in frames, a frame including main audio data, additional information required or used for decoding and a fingerprint or checksum value that relates at least to the additional information, and wherein the BL has at least two sections, wherein a first section is not encrypted, and in at least a second section the additional information is encrypted and main audio data are not encrypted, and the EL has at least a part of the data encrypted, wherein for decryption of the BL a different decryption key is required than for decryption of the EL.

In one embodiment, the encoding of the encrypted encoded audio signal is compliant with the MPEG-1 Layer-III (mp3) standard.

In one embodiment, the EL comprises header information containing information that specifies one or more temporal regions of the EL that are encrypted, wherein a part of said information is encrypted.

According to another aspect of the invention, an apparatus for encrypting an encoded audio signal, the encoded audio signal comprising BL and at least one EL, wherein the BL has audio data packetized in frames, a frame including main audio data, additional information used for decoding and a fingerprint value (such as CRC or checksum) that relates at least to the additional information, comprises means for separating the BL temporally into a first section and at least one second section, means for encrypting the additional information within frames of the second section of the BÖ, wherein the first section of the BL and the main audio data of the second section of the BL are not encrypted, and means for encrypting at least a part of the data of the EL, wherein the encrypted section of the BL and the encrypted EL require different decryption keys for decryption.

In one embodiment, the apparatus further comprises means for inserting into the base layer one or more additional frames containing auxiliary data that include Digital Rights Management (DRM) indication, preview duration indication or content owner contact information.

In one embodiment, the apparatus further comprises means for specifying one or more temporal regions of the EL, means for encrypting some or all of the specified temporal regions, means for generating information that specifies the regions of the EL that are encrypted, or information that specifies how a particular region of the EL is encrypted, means for encrypting at least a part of said generated information, and means for inserting the encrypted information into the header of the EL.

Further details of the invention and advantageous embodiments are disclosed in the dependent claims, the following description and the figures.

BRIEF DESCRIPTION OF THE DRAWINGS

Exemplary embodiments of the invention are described with reference to the accompanying drawings, which show in FIG. 1 partitioning of an audio file with different layers in different protection zones.

DETAILED DESCRIPTION OF THE INVENTION

Figure 1:
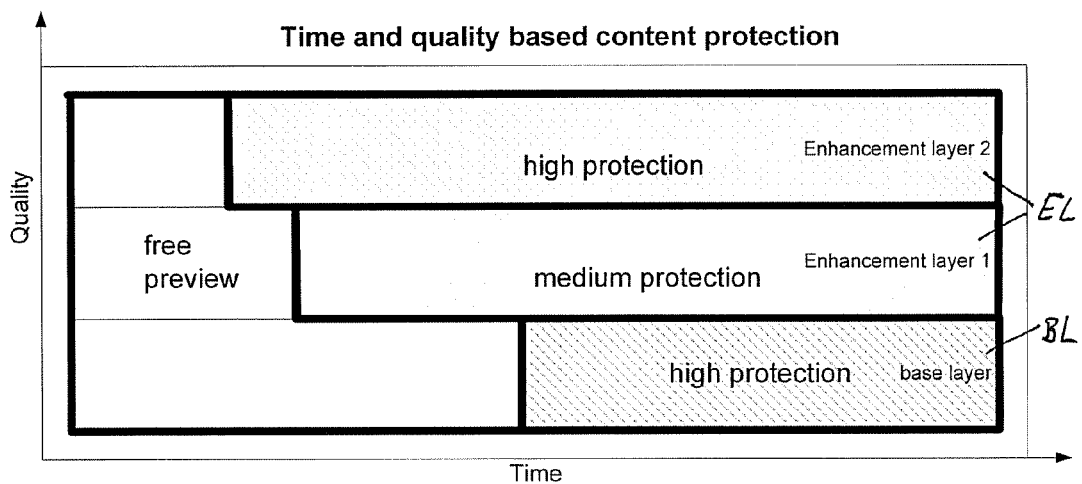

Audio data can be arranged in different quality layers that are hierarchically sorted. FIG. 1 shows an example with a file that contains a base layer and two enhancement layers EL1, EL2. Each enhancement layer adds additional quality to the base layer. The layers are partitioned into protection zones, wherein each protection zone can have different protection grades.

One aspect of the present invention is that for the purpose of customer motivation a protection free preview should be available for everyone instead of denying access completely to all but certified users. The unprotected preview zone may be used e.g. for distribution of the file for advertising purposes. Thus, the present invention enables content owners to set preview regions or zones in time and quality dimensions. For example, a preview can have the original duration and less quality than the base layer, or it may be limited over time with free access to one or several enhancement layers. The position and duration of unprotected regions are arbitrary. The same holds for the enhancement layers that provide a free preview zone. Not all enhancement layers need to provide a free preview zone, and the free preview zone can but needs not necessarily be at the beginning of the file.

The base layer enables decoding of the signal at the lowest quality. In the example shown in FIG. 1 it has sufficient quality for being attractive for users, and therefore includes also a protected zone, with a high protection grade. For the base layer, this is particularly useful when the base layer is necessary for decoding most or all enhancement layers, or when it has acceptable quality. In another example the quality of the base layer may be very poor, and thus it may be freely accessible completely.

The base layer is regarded as a first protection zone. The next protection zones are in the enhancement layers and include additional information. These layers can increase the signal quality in different ways. For a lossy encoded base layer, such as for mp3 or MPEG-4 SLS (scalable lossless extension), additional enhancement layer data can improve the signal quality in several steps, up to a lossless reconstructed version of the content. Enhancement layers can also provide e.g. surround sound data or other additional multimedia information.

Advantageously, the protection level and the preview area can be defined independently for the base layer and each enhancement layer. If usage of enhancement layers requires the base layer, a lower protection grade for enhancement layers can be used and the protection grade for the base layer may be higher. This flexibility enables content sellers to offer a high variety of choices to customers.

In FIG. 1 it is assumed that decoding of Enhancement_Layer_1 requires also base layer data, and thus it is lower protected because it can not be used alone. However, the Enhancement_Layer_2 as the third quality layer may enable a high quality improvement, and hence a higher protection grade is preferred.

Quality is understood as signal quality (resolution), spatial information or generally all properties that make the content more attractive. The present invention uses Digital Rights Management (DRM) techniques to protect different layers against illegal usage. Different storage formats and the dependencies between layers lead to different DRM scenarios. Consequently the base layer has different protection needs compared to enhancement layers. However, enhancement layers need user dependent protection to enable individual access of different certified base layer users. With respect to mp3 lossless file formats, examples for sound quality layer protection are presented below.

Figure 2:
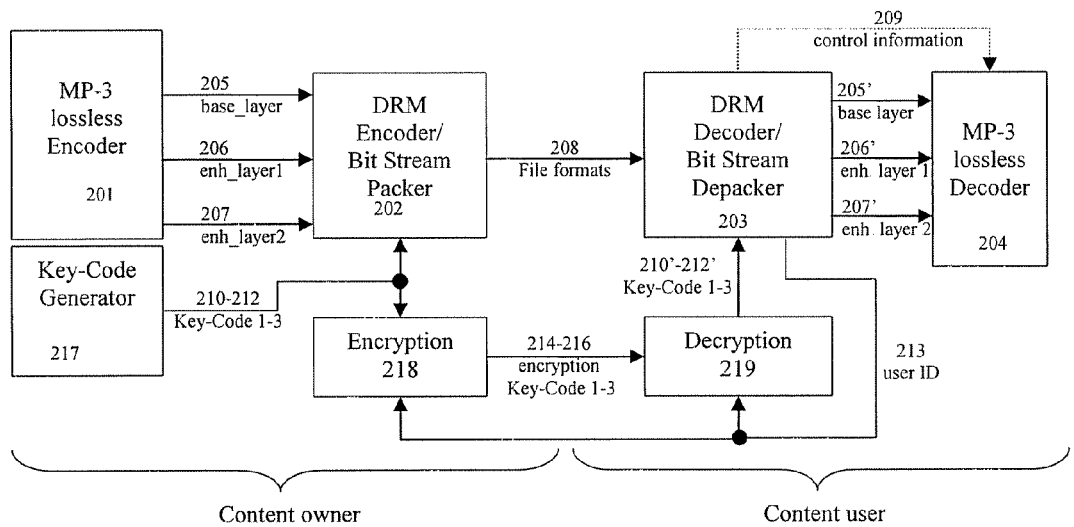
FIG. 2 an exemplary DRM scenario for three layers of an mp3 lossless encoder.

Content access rights have to be observed by DRM to prevent illegal copies or illegal usage. FIG. 2 shows an example for a DRM scenario with three quality layers. An arbitrary audio encoder 201 produces three different data layers 205-207 that are given to the DRM encoder and bit stream packer 202, which encrypts each layer with separate Key-Codes 210-212 and packs the layer into a specific format 208, e.g. a file or stream format.

A DRM decoder and bit stream depacker 203 can unpack the format and decrypt each layer using the corresponding Key-Codes 210'-212'. Control information 209, e.g. layer permissions and preview zone definitions, and the decrypted layers 205-207 are given to the decoder 204. A user dependent Key-Code encryption can be used to ensure that only an authorized user can use the content. The Key-Codes 210-212 are generated for all layers of content by a Key-Code generator 217. Each authorized user has an individual identification code, e.g. user ID 213, which the user provides to a DRM decoder 203. Thus, the decoder 203 is user certified. The user ID 213 may be used to encrypt the Key-Codes 210-212 at the content owner side, and to decrypt the encrypted Key-Codes 214-216 at the user side.

Encryption of layers in the DRM encoder and bit stream packer 202 can be done for all the data of one layer, or only for a significant part. For example, the data of each layer can start with a header that contains important information for main data decoding. The main data of the layer can only be used when the header can be decrypted.

Figure 3:
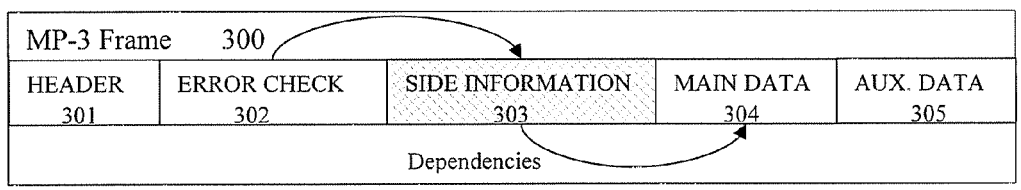
FIG. 3 an mp3 frame with encrypted side information.

In the following, a DRM example for a lossless mp3 (MPEG-1 Layer-III) format is given. A lossless mp3 extension, as described e.g. in the European Patent Application EP06113867, offers scalable sound quality. Three different layers can be used. A standard mp3 file serves as base layer 205. The first enhancement layer 206 upgrades the mp3 quality to a higher sound quality representation. The second enhancement layer 207 can be used to generate a lossless (ie. bit-exact) copy of the original signal.

mp3 formatted files contain many data frames. FIG. 3 shows an exemplary mp3 frame 300. Each frame 300 is divided into header data 301, optional error check data 302, side information data 303, main data 304 and auxiliary data 305. The frame 300 complies with the mp3 standard, except that its side information 303 is encrypted according to the invention. mp3 error protection adds a parity check word into frame data 302, which is calculated out of the side information 303 of the frame. During decoding the parity check word is calculated again and compared to the parity check word within the frame 302.

The encryption of side information 303 makes main data 304 useless and leads to parity check error in the decoder. In a standard mp3 decoder, an error check failure mutes the playback of a frame. The protection of mp3 files is therefore done by using error check protected mp3 files (crc) and encryption of the side information 303. This has the advantage that it can be handled by standard mp3 decoders, because they are not brought out of control when the side information is corrupted.

Preferably, only every $N^{th}$ frame 501 is encrypted. This reduces computational complexity and leads to annoying breaks when playing an encrypted file. N is preferably constant, but it may also be variable.

A DRM encoder 202 encrypts the side information 303 using e.g. Key-Code_1 210. The DRM decoder 203 checks the parity check word for each frame. If parity check fails, reconstruction of original side information will be done with Key-Code_1 210. If a wrong Key-Code is used or data is corrupted, the second parity check of the mp3 decoder in the mp3 decoder block 204 will fail and the frame will be ignored. In embodiments where the encryption begins after a defined time or at a defined frame, a free preview area 503 is defined that can be recognized and played by every standard mp3 player.

Figure 5:
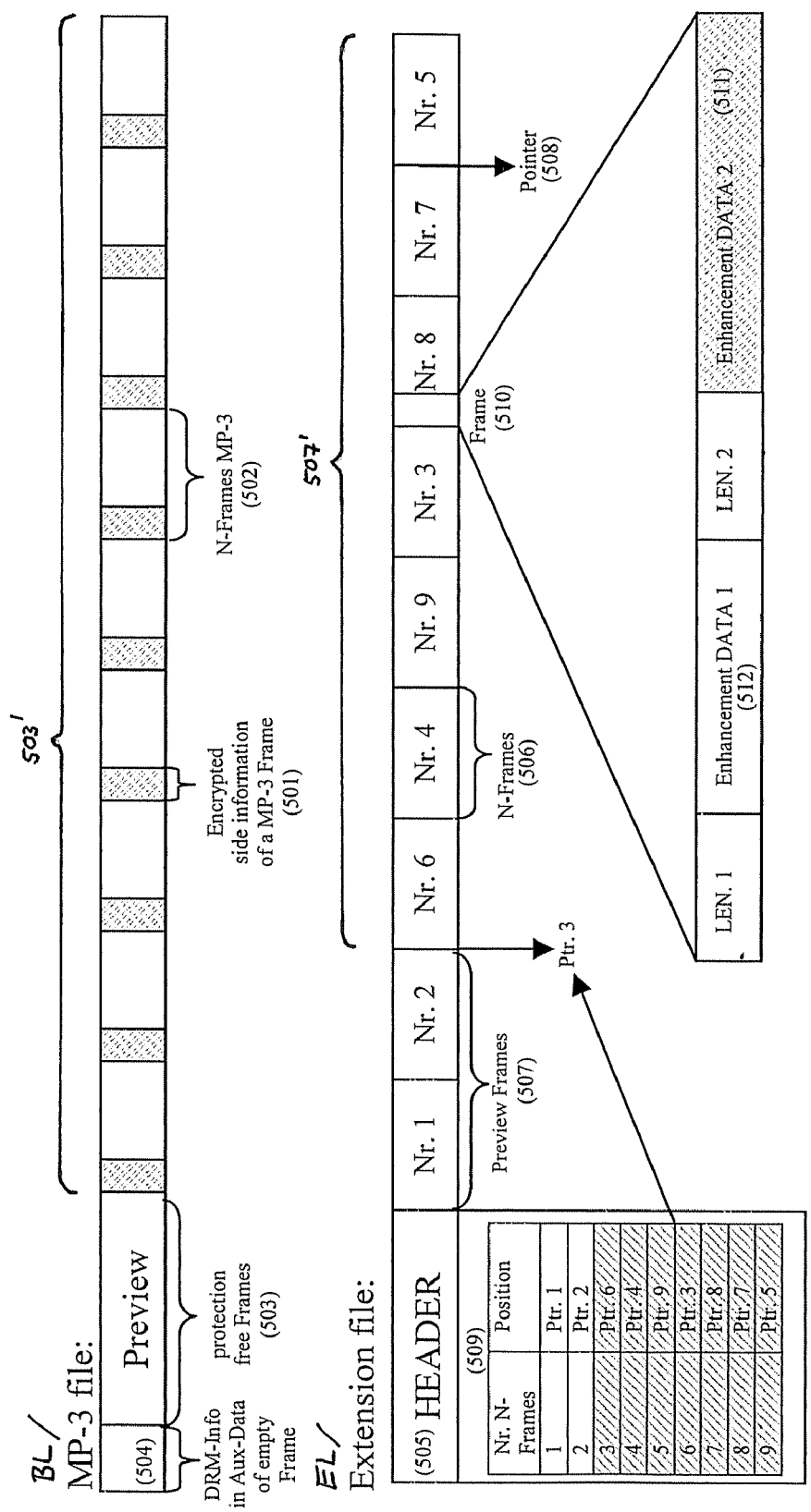
FIG. 5 a DRM scenario for mp3 lossless format consisting of two files.

For additional DRM information 504, like DRM indication, preview duration or content owner contact, auxiliary data 305 can be used. Therefore an empty mp3 frame 504 containing only auxiliary data 305 of additional DRM information can be used, particularly in file based formats as shown in FIG. 5. In stream formats the auxiliary data 305 of the encrypted frame can contain the DRM information. Auxiliary data is exploited by the DRM decoder 203 and sent as control information 209 to the decoder 204. Thus, the decoder 204 can recognize and determine the preview zone and can e.g. inform the user about preview duration, content owner contact data for layer updates etc.

Figure 4:
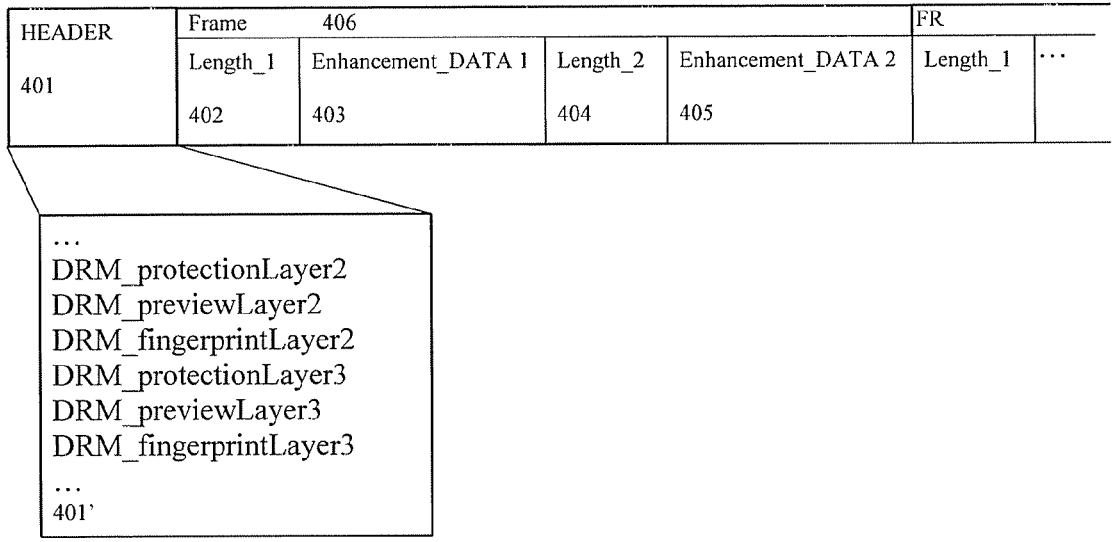
FIG. 4 mp3 lossless extension data.

In the following, DRM for mp3 lossless extension data is described. FIG. 4 shows exemplarily mp3 lossless extension data. An enhancement layer frame 406 contains two data blocks 403, 405 carrying information for enhancement layer 1 and layer 2. Data block length is stored at the beginning 402, 404 of each enhancement data block. Global information for the extension data is stored within an additional header 401. The header may include data for various DRM options.

For example, DRM properties in extension file header may be
DRM_protectionLayer2
DRM_previewLayer2
DRM_fingerprintLayer2
DRM_protectionLayer3
DRM_previewLayer3
DRM_fingerprintLayer3

Additionally, headers in stream formats may optionally comprise DRM_blockArrangeLayer2 and/or DRM_blockNrLayer2.

DRM_protectionLayer contains information about the used encryption technique of each layer. Encryption free frames can be used as preview zone of each enhancement layer. DRM_previewLayer depicts the numbers of encryption free frames, starting form the first frame to enable a free preview of each layer. DRM_fingerprintLayer is used to check validation of decryption. It contains a CRC fingerprint of the data before encryption. After decryption in the DRM decoder 203, the fingerprint is calculated again and compared with DRM_fingerprintLayer. If both fingerprints are identical, the decrypted data can be given to the decoder 204. Otherwise, usage of enhancement layer data will be denied for the decoder 204 via control information 209. The optional stream format option offers a special encryption technique described below.

In the following, DRM for the following three mp3 lossless formats 208 are described: "Two files" format, "Two streams" format and "Single file" formats.

The two file format consists of a standard mp3 file and an extension file. The mp3 file is protected as shown in FIG. 3 and described above. The extension file format is shown in FIG. 5. It starts with the file header 505 followed by all frames 510. The header includes a cue point table data block 509 that points to N adjacent frames 506, using e.g. a pointer 508. The extension file contains two enhancement layers DATA1, DATA2. Protection of layer 2 can be done by one of three different DRM_protectionLayer2 options, that may be denoted e.g. by
0: No protection (ie. no encryption) of layer 2
1: Frame mixing and table encryption is used
2: Direct encryption of layer 2 data Permuting the order of groups of N frames 506, ie. frame mixing, and encryption of correctly ordered table entries 509 can be used. However, it is a relatively low complexity encryption technique. In a better embodiment, N is not constant for all DRM encoder, and this information is included in the file header 505. The DRM decoder 203 can bring frames into the correct order by decryption of the table 509 and exploiting the entries. However, the number of permutation is limited and the right order can be determined by trying. In a better embodiment, blocks of N bytes of whole frame data are taken instead of N frames. This increases security because the block boundaries are not equal to frame boundaries. Encryption of the complete layer 2 data 512 is more complex but offers a higher degree of security.

Unprotected first table entries for the data of the first enhancement layer 512 offer previews of this layer. The number of unprotected frames 507 is stored in DRM_previewLayer2, and sent as control information 209 to the mp3 lossless decoder 204. The unprotected first enhancement layer data or frame is consistent with unprotected mp3 data, because the first enhancement layer depends on the base layer. Protection of the second enhancement layer is done directly by encryption of the second enhancement layer data 511 using Key-Code_3 212. DRM_protectionLayer3 thus can be zero for indicating "no protection", or one for indicating encryption of the complete data of the second enhancement layer 511. This layer also offers the opportunity of preview zones. The number of protection free layer 3 data frames 511 can be defined in the DRM_previewLayer3 parameter, and retrieved from there.

Figure 6:
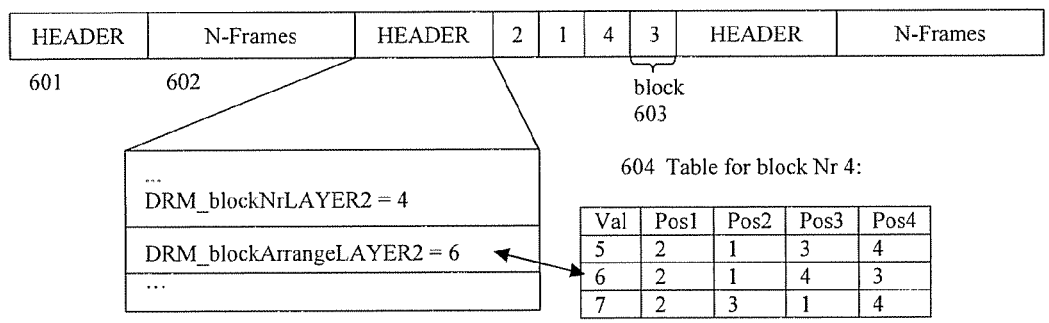
FIG. 6 mp3 lossless enhancement data for a dual stream format.

FIG. 6 shows the alternatively usable "two streams" format, where the first enhancement layer is protected by permutation on block level and encryption of correct order information within the header. The protection scenario for this format is slightly different from the "two files" format, though the mp3 file is encrypted as described for the "two files" format. However, in this embodiment of the invention the enhancement layer stream contains a new header 601 for every N frames 602.

Except for the released cue pointer table data and new additional DRM information, the header 601 is almost the same as in the above example. A simple way to protect the first enhancement layer is to use direct data encryption of its data 403, as indicated by DRM_protectionLayer2=2. DRM_blockArrangeLayer2 and DRM_blockNrLayer2 are added to the streaming header 601 to enable low complexity frame mixing and table encryption. Data of N adjacent frames 602 belonging to a first header 601 is divided into blocks 603 of equal length (in terms of bytes). DRM_blockNrLayer2 indicates the number of used blocks. If the data can not be divided into DRM_blockNrLayer2 blocks of equal length, defined rounding rules can be used. Then the blocks 603 are mixed arbitrarily. E.g. each possible arrangement or permutation of DRM_blockNrLayer2 blocks obtains a specific symbol that is stored in the table 604 of the corresponding header. For each permitted number of blocks a separate table is installed in the respective header.

DRM_blockArrangeLayer2 is assigned to the symbol of the currently used permutation, and is encrypted using the Key-Code_2 211. The DRM decoder 203 can arrange the blocks to their correct order by decrypting DRM_blockArrangeLayer2 and searching the correct entry in the table 604. Table selection can be done by the number of used blocks stored in DRM_blockNrLayer2.

Encryption of the data of the second enhancement layer can be done equivalent to the "two files" format described above.

Further, "one file" formats are possible, which include multiplexed combinations of the "two file" format and the "stream" format. Headers and frame structures of mp3 data and extension data is equivalent to the "two files" and the "stream" formats. Thus, protection strategies of these formats can be used as well for the "one file" formats.

An advantage of the present invention is that customers can chose between different signal qualities due to their needs or upgrade lower quality signals to higher quality without breaching copyrights. Another advantage is that uncertified users may get free previews of different quality levels and can decide which level they want to buy. Protection grades can be adapted to different time and quality zones.

A further advantage is that quality aspects and content previews are added into DRM for hierarchically ordered file and streaming formats.

In principle the invention is applicable for protection of scalable media content stored in file formats comparable to the described mp-3 lossless format.

The invention claimed is:

1. A method for encrypting an encoded audio signal, the encoded audio signal comprising base layer and at least one enhancement layer, wherein the base layer has audio data packed in frames, wherein a frame comprises header, main audio data, additional information used for decoding and error check data relating at least to the additional information, the method comprising the steps of
    separating the base layer temporally into a first section and at least one second section;
    encrypting the additional information within frames of the second section of the base layer, wherein the first section of the base layer and the main audio data of the second section of the base layer are not encrypted; and
    encrypting at least a part of the data of the enhancement layer, wherein the encrypted section of the base layer and the encrypted enhancement layer require different decryption keys for decryption, wherein the enhancement layer header contains information that specifies one or more temporal regions of the enhancement layer that are encrypted, and wherein a part of said information is encrypted.

2. A method according to claim 1, further comprising the step of inserting into the base layer one or more frames containing auxiliary data, the auxiliary data including Digital Rights Management indication, preview duration indication or content owner contact information.

3. A method according to claim 1, wherein the enhancement layer has a header and at least two sub-layers and is structured in frames, wherein a frame contains at least one data packet for each of the sub-layers, and wherein the packets for at least one sub-layer are encrypted.

4. A method according to claim 1, wherein said information in the enhancement layer header specifies how audio data in the respective region of the enhancement layer are permutated.

5. A method according to claim 1, wherein said information in the enhancement layer header comprises a fingerprint value that is derived from the encrypted enhancement layer before encryption.

6. A method according to claim 1, wherein said information in the enhancement layer header comprises a list, the list containing pointers that point at groups of adjacent enhancement layer blocks or frames, and further comprises information that specifies encryption and/or decryption information for the respective group.

7. A method according to claim 6, wherein the encryption information comprises an indication of data permutation within the respective group of blocks or frames.

8. A method for decrypting an encrypted audio signal, the audio signal comprising a base layer and at least one enhancement layer, wherein the base layer has audio data packed in frames, wherein a frame comprises header, main audio data, additional information and error check data relating at least to the additional information, and wherein the base layer is temporally separated into first frames of a first section and second frames of at least one second section, wherein an enhancement layer header contains information specifying one or more temporal regions of the enhancement layer that are encrypted, and wherein at least a part of said information is encrypted, the method comprising the steps of
    decrypting the additional information within the second frames of the second section of the base layer, wherein a first decryption key is used;
    determining, according to said information in the enhancement layer header, at least a part of the data of at least one enhancement layer;
    decrypting the determined data of at least one enhancement layer, wherein a second decryption key is used that is different from said first decryption key; and
    decoding the decrypted base layer and enhancement layer audio signals.

9. The method according to claim 8, further comprising steps of
    extracting auxiliary data from a base-layer frame, the auxiliary data including DRM indications or preview duration indications;

generating control information based on the auxiliary data;
providing the control information for decoding; and
based on the control information, determining within the base-layer or enhancement-layer data a section to be decoded.

10. An apparatus for encrypting an encoded audio signal, the encoded audio signal comprising base layer and at least one enhancement layer, wherein the base layer has audio data packed in frames, wherein a frame comprises header, main audio data, additional information used for decoding and error check data relating at least to the additional information, the apparatus comprising a separator configured to separate the base layer temporally into a first section and at least one second section;

a processor configured to:
encrypt the additional information within frames of the second section of the base layer, wherein the first section of the base layer and the main audio data of the second section of the base layer are not encrypted;
encrypt at least a part of the data of the enhancement layer, wherein the encrypted section of the base layer and the encrypted enhancement layer require different decryption keys for decryption;
specify one or more temporal regions of the enhancement layer;
encrypt some or all of the specified temporal regions;
generate information that specifies the regions of the enhancement layer that are encrypted, or information that specifies how a particular region of the enhancement layer is encrypted;
encrypt at least a part of said generated information; and
insert the encrypted information into the header of the enhancement layer.

11. An apparatus according to claim 10, further comprising an inserter configured to insert into the base layer one or more frames containing auxiliary data, the auxiliary data including Digital Rights Management indication, preview duration indication or content owner contact information.

12. An apparatus according to claim 10, wherein the processor configured for encrypting some or all of the specified temporal regions performs permutation of the data across frame borders within a region.

* * * * *